June 7, 1932. H. RÖHL 1,861,979
REFRIGERATING APPARATUS
Filed Nov. 20, 1929
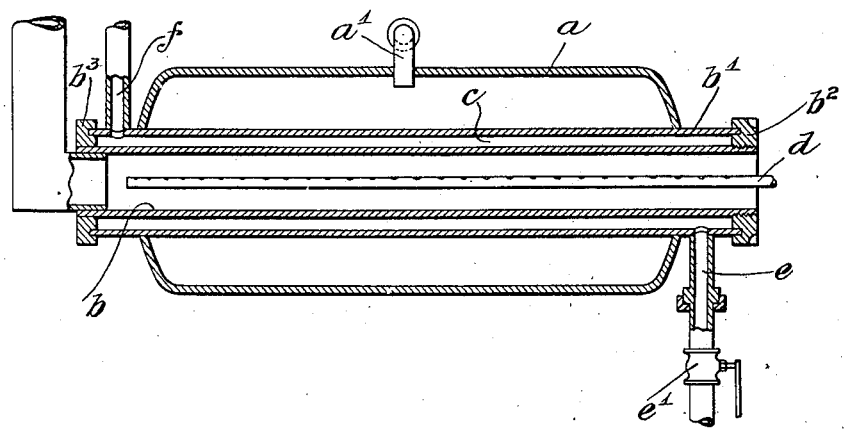
Hans Röhl
INVENTOR
BY W. B. Whitney
ATTORNEY Patented June 7, 1932

1,861,979

UNITED STATES PATENT OFFICE

HANS RÖHL, OF MANNHEIM, GERMANY, ASSIGNOR TO SCHWARZWALDWERKE LANZ, G. M. B. H., OF MANNHEIM, GERMANY

REFRIGERATING APPARATUS

Application filed November 20, 1929, Serial No. 408,466, and in Germany November 30, 1928.

This invention relates to refrigerating apparatus of the absorption type, and, specifically, to the means for alternately cooling and heating the absorption material enclosed within the so-called absorption-expulsion vessel.

The means usually provided for this purpose comprise two concentric tubes which extend through the vessel and form between them an annular channel for the cooling water; and, as heretofore constructed and operated, these tubes have been held spaced apart and metallically bonded together by ribs extending from one to the other through this water channel and the heating of the vessel has been effected by the conduction of the heat, which is supplied by electric current, gas jet, steam or otherwise, from the inner wall of the inner tube through this tube and the ribs and thence through the outer tube to the surrounding plates on which the absorption material is disposed.

With a more direct heating of the absorption-expulsion vessel of the apparatus, either by an open gas jet or by an electric heating element, it is impossible to avoid an injurious local overheating of the vessel wherein is contained a mixture of the absorption material and the cooling medium, and for the cooling of the vessel during the absorption period it is necessary to provide special means, such as coils of pipe and the like.

And with indirect heating, where the small size of the apparatus necessitates simplicity of structure and hence the cooling is effected as stated by means of an annular film of water interposed between the heating element and the wall of the tubular chamber containing the absorption material, it is not advisable to produce steam or water pressure in the annular space between the two tubes and consequently the absorption material within the chamber cannot be heated to a temperature higher than that approximating the boiling point of the water—a temperature which in dry absorption is too low for satisfactory results.

I have obviated the above-noted objections by my present invention, which consists in so mounting the concentric tubes with which the absorption-expulsion vessel is equipped that there is no metallic connection between the two, and in providing the water inlet pipe to the intermediate annular channel with a control valve whereby the water is allowed to flow through this channel only during the absorption period and then, throughout the expulsion period, the water inlet pipe is closed and the water contained within the channel is by the steam formed expelled therefrom through the outlet pipe, which at all times remains open.

The invention will be understood by reference to the accompanying drawing in the single figure of which there is shown, in section, the casing of an absorption-expulsion vessel equipped with my improved means for cooling and heating the interior thereof.

As shown, $a$ is the casing of the vessel, within which the absorption material (not shown) is disposed in the usual or in any suitable manner, and $a^1$ is the pipe through which the refrigerating medium is admitted to and expelled therefrom, $b$ and $b^1$ are the concentric tubes which serve as heating and cooling tubes respectively and between which there is formed the annular water channel $c$. The outer tube $b^1$ is, or may be, secured to the end walls of the vessel, through which it passes, in any suitable manner; and the inner tube $b$ is supported in position therein by means of annular end pieces $b^2$ and $b^3$, preferably of a nonmetallic material, and is readily withdrawable therefrom on the removal of one of the end pieces, the end piece $b^2$ for example, which for the purpose is threaded upon the end of the tube. The heater by which the inner tube is heated is indicated at $d$; and $e$ and $f$ are respectively the water inlet and outlet pipes to and from the channel $c$, the inlet pipe being provided with a valve $e^1$.

The operation of the apparatus is as follows:

With the turning on of the heat, at the beginning of an expulsion period, the valve of the water inlet pipe is closed, with the result that the water contained within the annular channel is first heated and then, as steam is generated, is expelled from the channel through the outlet pipe partly in the form of water and partly in the form of steam. Accordingly, the absorption material within the vessel, with the refrigerating medium held therein, will be heated indirectly from the directly heated inner tube, at first by heat conducted therefrom through the water as it is being heated and later, when the annular chamber has been exhausted by the steam generated, by the radiation of the heat from the inner tube across to the outer tube and thence to the absorption material. Hence, the temperature to which the interior of the vessel may be heated is not limited to the temperature of boiling water but can be freely carried above such point. At the same time the contents of the vessel cannot be injuriously affected by any local overheating of the inner tube.

At the end of the expulsion period, as the heat is turned off the valve in the water inlet pipe is opened so that water flows into and through the annular channel c, with the result that the contents of the vessel will be quickly cooled at the very beginning of the absorption period.

The fact that the inner tube is removable from the outer tube facilitates the cleaning of the interior.

It is to be understood that the invention can be modified in its several details, within the scope of the appended claims, without departing from the spirit or sacrificing the substantial advantages thereof.

What I claim as new, and desire to secure by Letters Patent, is—

1. In refrigerating apparatus of the type described, an absorption-expulsion vessel comprising, as means for alternately cooling and heating the interior thereof, two concentric tubes extending through the vessel and forming between them an annular channel, water inlet and water outlet pipes to and from said channel, means for heating the inner wall of the inner tube, and means for closing the water inlet pipe while the water outlet pipe remains open, whereby water is caused to circulate through said annular channel during the absorption period only and at the beginning of the expulsion period the supply of water is cut off and the said channel is exhausted of water by the heating of the inner tube.

2. In refrigerating apparatus of the type described, an absorption-expulsion vessel comprising, as means for alternately cooling and heating the interior thereof, a tube extending through the vessel and closely fitted to the end walls thereof, a second tube withdrawably mounted within the outer tube by non-metallic end connections to form an annular channel between the tubes, a water inlet pipe to and a water outlet pipe from said channel, means for heating the interior of the inner tube, and means for closing the water inlet pipe while the water outlet pipe remains open.

3. In refrigerating apparatus of the absorption-expulsion type, the combination of a vessel containing the absorption material, a heating element arranged within and extending in spaced relationship therewith, a fluid cooling medium, and means for alternately effecting the activation of the heating element and a flow of the cooling medium through the vessel in an annular body surrounding the heating element, said means being operative, while the heating element is activated, to stop the flow of the cooling medium and by the heat generated to effect the expulsion of the body of the cooling medium surrounding the heating element.

HANS RÖHL.